United States Patent [19]
Sakaegi et al.

[11] Patent Number: 6,009,232
[45] Date of Patent: Dec. 28, 1999

[54] SIMULTANEOUS DISPLAY OF MULTIPLE IMAGES REPRODUCED FROM A RECORDING MEDIUM WITH FORWARD AND BACKWARD KEYS

[75] Inventors: Yuji Sakaegi, Kawasaki; Nobuyuki Suzuki; Yoshinobu Sato, both of Yokohama, all of Japan

[73] Assignee: Canon Kabushiki Kaisha, Tokyo, Japan

[21] Appl. No.: 08/921,707

[22] Filed: Sep. 2, 1997

Related U.S. Application Data

[60] Continuation of application No. 08/565,358, Nov. 30, 1995, abandoned, which is a division of application No. 08/384,222, Feb. 6, 1995, Pat. No. 5,500,743, which is a continuation of application No. 07/934,228, Aug. 25, 1992, abandoned.

[30]  Foreign Application Priority Data

Aug. 27, 1991 [JP] Japan .................................. 3-215484
Aug. 27, 1991 [JP] Japan .................................. 3-215615
Aug. 28, 1991 [JP] Japan .................................. 3-217021
Aug. 28, 1991 [JP] Japan .................................. 3-217022

[51] Int. Cl.⁶ ...................................................... H04N 5/781
[52] U.S. Cl. ............................................. 386/70; 345/115
[58] Field of Search .............................. 345/115; 386/69, 386/70; 358/403

[56]  References Cited

U.S. PATENT DOCUMENTS 5,500,743  3/1996  Sakaegi et al. ......................... 358/403

*Primary Examiner*—Mark R. Powell
*Attorney, Agent, or Firm*—Fitzpatrick, Cella, Harper & Scinto

[57]  ABSTRACT

A desired combination of reproduced images can be easily obtained in a multi-reproduction mode. When a ten-key input is made and a four-picture display mode is selected, a reproduced image from a ten-key input track is displayed on a small frame where a cursor is located. When a four-picture display key is depressed in a full-screen display mode, four images starting from the full-screen displayed image are simultaneously displayed. When the four-picture display key is continuously operated, four following images including the displayed lower right-hand image are simultaneously displayed.

4 Claims, 17 Drawing Sheets

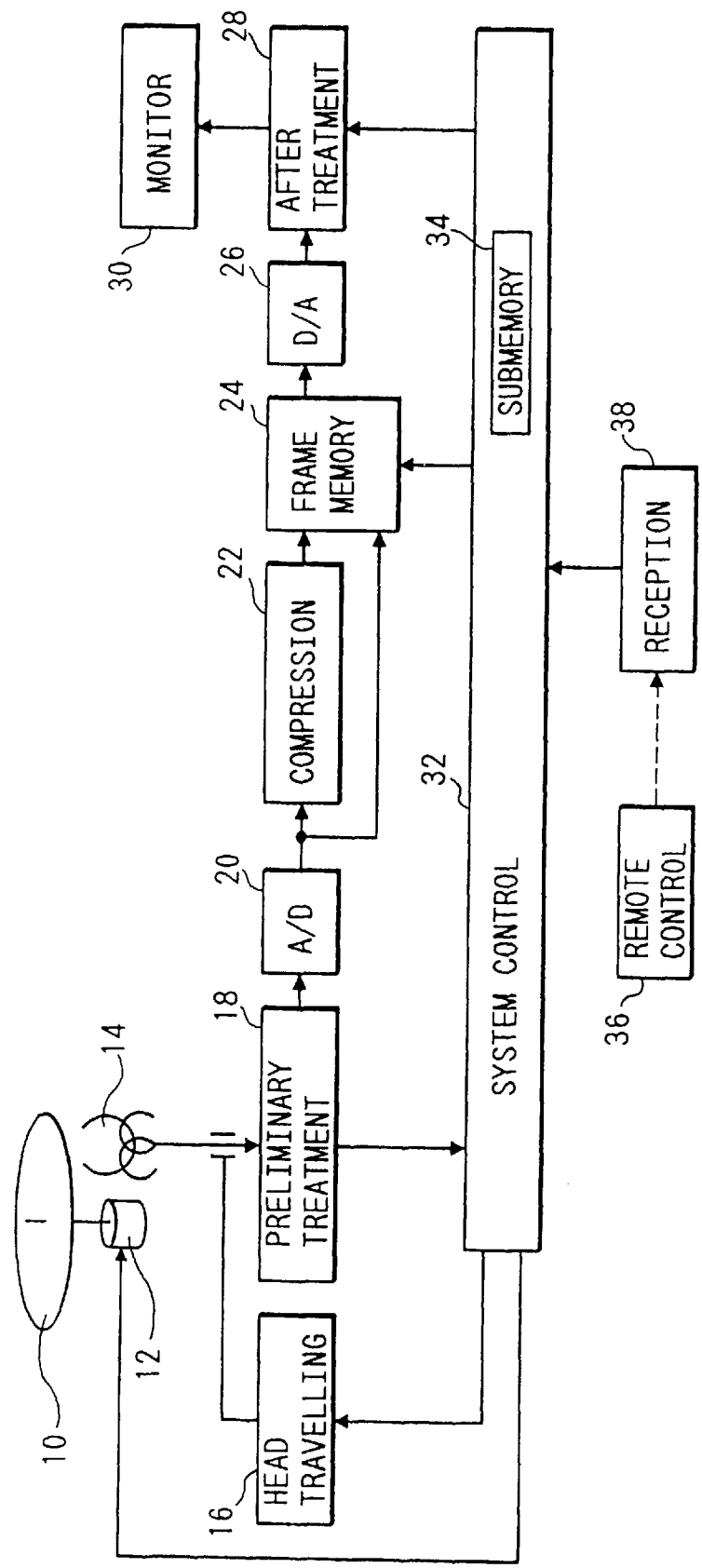

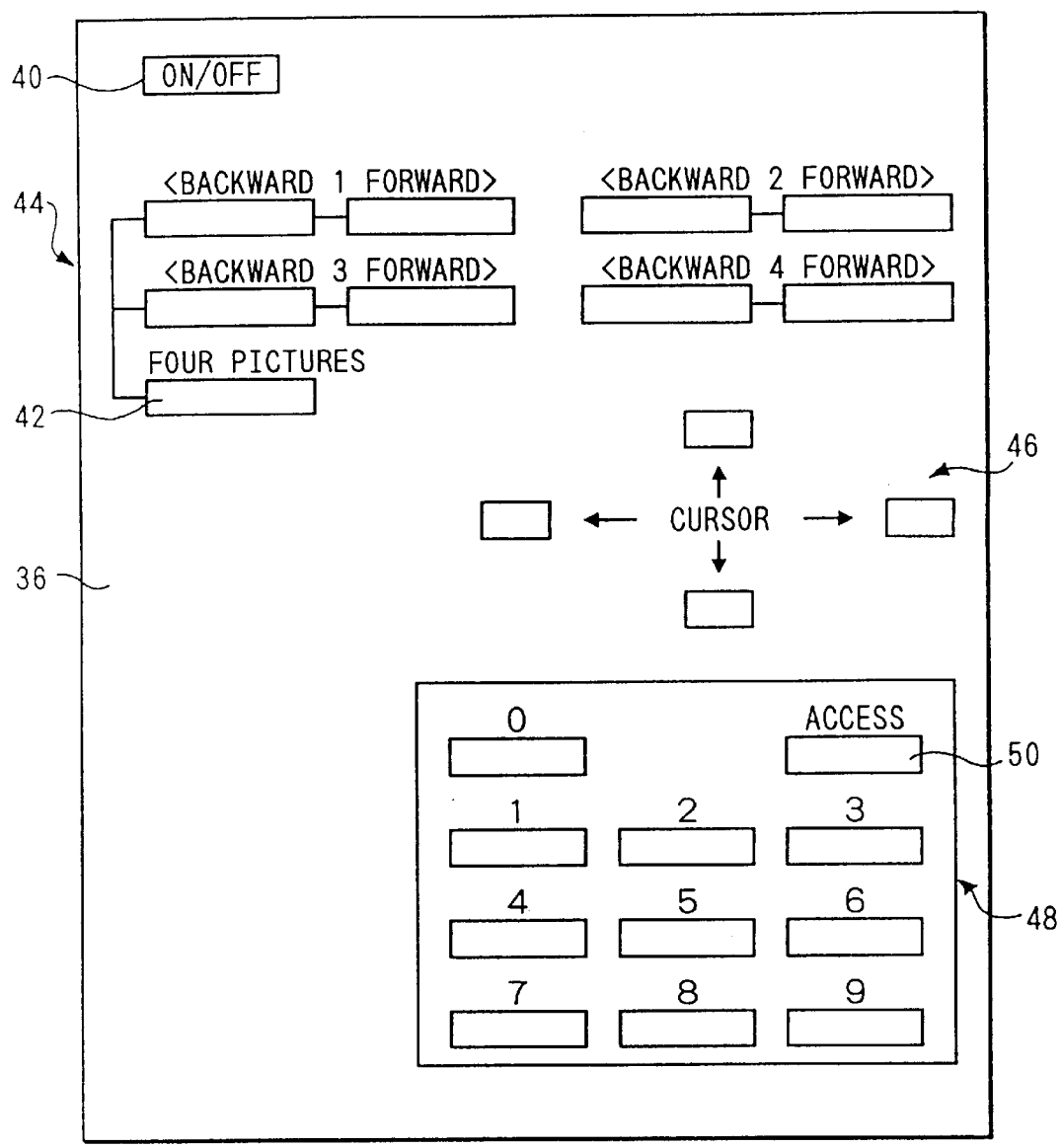

SIMULTANEOUS DISPLAY OF MULTIPLE IMAGES REPRODUCED FROM A RECORDING MEDIUM WITH FORWARD AND BACKWARD KEYS

This application is a continuation, of application Ser. No. 08/565,358, filed Nov. 30, 1995, now abandoned, which is a division of application Ser. No. 08/384,222, filed Feb. 6, 1995, now U.S. Pat. No. 5,500,743, which is continuation of application Ser. No. 07/934,228, filed Aug. 25, 1992, now abandoned.

BACKGROUND OF THE INVENTION

1. Field of the Invention

The present invention relates to an image reproduction apparatus and, more particularly, to an image reproduction apparatus for reproducing and outputting a still image.

2. Related Background Art

Some image reproduction apparatuses of this type comprise a multi-picture function for simultaneously displaying a plurality of images recorded on a recording medium on one screen. For example, a still video floppy can record a maximum of 50 still images, and a reproduction apparatus therefor, which can simultaneously display four images, 25 images, or the like, is proposed. For example, in an apparatus capable of performing a four-picture display operation for simultaneously displaying four images, forward and backward track feed keys are assigned to each of four small frames. Upon operation of these keys, four images recorded on arbitrary tracks can be simultaneously reproduced and displayed.

However, in this prior art, the forward and backward track feed keys of each small frame must be operated a number of times until desired images are displayed on the four small frames, resulting in very poor operability.

Some conventional apparatuses comprise a multi-picture function for simultaneously displaying a plurality of images recorded on a recording medium on one screen. For example, a still video floppy can record a maximum of 50 still images, and a reproduction apparatus therefor, which can simultaneously display four images, 25 images, or the like, is proposed. For example, in an apparatus capable of performing a four-picture display operation for simultaneously displaying four images, forward and backward track feed keys are assigned to each of four small frames. Upon operation of these keys, four images recorded on arbitrary tracks can be simultaneously reproduced and displayed.

However, in this prior art, in order to sequentially check the recording contents of the still video floppy, the forward or backward track feed key must be operated a number of times, resulting in very poor operability. Although the apparatus has the function for simultaneously displaying four images, the images must be fed in units of small frames in the multi-picture display mode, resulting in inconvenience.

In the multi-picture display mode for simultaneously displaying a plurality of images per display frame, the following arrangement is known as a means for designating each displayed image. That is, a cursor (i.e., a pointer) is displayed on a screen, and is moved in the horizontal and vertical directions on the full frame using cursor keys or a mouse.

For example, in a still video floppy reproduction apparatus, a four-picture display mode for displaying four reproduced images on one screen, a 25-picture display mode for displaying 25 reproduced images on one screen, and the like are proposed. Furthermore, an arrangement for superimposing a track number and the like of each displayed image in the multi-picture mode as index information is also known.

A video printer for printing an image displayed in the multi-picture mode onto a paper sheet has become popular, and often constitutes a system together with an image reproduction apparatus, and a monitor device for displaying reproduced output images. For example, images reproduced by the image reproduction apparatus are displayed on the monitor device, and a desired image is printed by the video printer.

In such a method of using the conventional image reproduction system, however, an image signal output to the video printer is a video signal superimposed with the monitor output cursor and the index information, and the video printer undesirably prints the cursor at its display position together with a designated image. The same applies to a case wherein an image reproduced by the image reproduction apparatus is recorded on another recording medium by an image recording apparatus.

In the conventional reproduction apparatus, an electromagnetic conversion means for recording or reproducing a video signal on or from two adjacent tracks comprises either a single magnetic head (field head) or an in-line head (or a frame head) obtained by integrating two magnetic heads to be separated by one track pitch. In the case of the field head, an image memory for storing a reproduced video signal for at least one field is required.

Normally, a time required for moving a magnetic head to a neighboring track is about 100 ms. However, when the in-line head is used, a track feed operation can be substantially instantaneously realized by an electrical switching operation.

A still video floppy recording/reproduction apparatus, e.g., an electronic still camera, normally comprises a display means for displaying a track number corresponding to the position of a magnetic head. In the case of the in-line head, in a frame recording or reproduction mode, the track number of an outer one of two tracks opposing the magnetic head is displayed.

On the other hand, in the single magnetic head (field head), the track number of a track opposing the magnetic head is displayed regardless of a frame recording (or reproduction) mode or a field recording (or reproduction) mode. For example, in the frame reproduction mode, after a video signal in the first field is reproduced and stored in an image memory, the magnetic head is moved to an inner track where the second field is recorded so as to reproduce the second field. The frame reproduction mode is realized upon repetition of the reading operation of the video signal of the first field from the image memory, and the reproduction/output operation of the video signal of the second field from the inner track. Therefore, when the frame reproduction mode is executed using the field head, the inner track number is displayed for a longer period of time.

In this manner, the apparatuses using the in-line head and the field head have different track numbers to be displayed in the frame recording (or reproduction) mode. This unnecessarily confuses a user.

SUMMARY OF THE INVENTION

It is an object of the present invention to provide an image reproduction apparatus in consideration of the above-mentioned situation.

It is another object of the present invention to provide an image reproduction apparatus having improved operability.

It is still another object of the present invention to provide an image reproduction apparatus, with which a plurality of images can be visually observed at high speed.

In order to achieve the above objects, according to one preferred aspect of the present invention, there is disclosed an image reproduction apparatus, which has a full display function for displaying one still image reproduced from a recording medium on a full screen, and a multi reproduction function for simultaneously displaying a plurality of still images reproduced from the recording medium, comprising first designation means for designating the multi reproduction function, switching means for switching between a first changing mode and a second changing mode, and control means for, when the first changing mode is selected, multi-reproducing a predetermined number of images following images displayed in the multi-reproduction function, and for, when the second changing mode is selected, multi-reproducing a predetermined number of images preceding images displayed in the multi-reproduction function.

It is still another object of the present invention to provide a reproduction apparatus allowing a high-quality print operation.

It is still another object of the present invention to provide a reproduction apparatus which does not unnecessarily confuse a user.

Other objects and features of the present invention will be apparent from the following description of the embodiment of the present invention taken in conjunction with the accompanying drawings.

BRIEF DESCRIPTION OF THE DRAWINGS

FIG. 1 is a block diagram showing an arrangement according to the first embodiment of the present invention;

FIG. 2 is a front view of a wireless remote controller 36 shown in FIG. 1;

DETAILED DESCRIPTION OF THE PREFERRED EMBODIMENTS

Figure 3A:
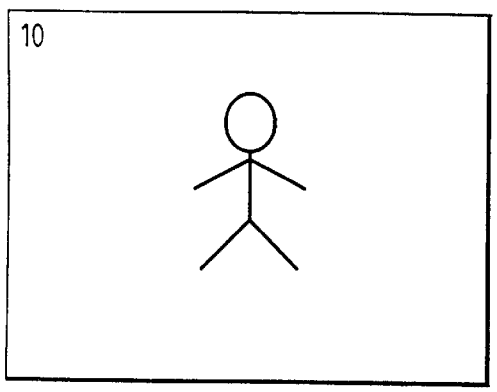
FIGS. 3A to 3D show display examples of a track number.

The preferred embodiments of the present invention will be described hereinafter with reference to the accompanying drawings.

FIG. 1 is a block diagram showing an arrangement of an apparatus according to the first embodiment of the present invention. The apparatus includes a magnetic disc 10 called a still video floppy, a motor 12 for rotating the magnetic disc 10, a reproduction head 14, and a head travelling device 16 for travelling the reproduction head in the radial direction of the magnetic disc 10.

The apparatus also includes a preliminary treatment circuit 18 for executing preliminary treatments (e.g., amplification, clamping, high-frequency removal, demodulation, deemphasis, and the like) of the output from the reproduction head 14, an A/D converter 20 for converting an analog output from the preliminary treatment circuit 18 into a digital signal, a compression circuit 22 for thinning out the output data from the A/D converter 20 to ½ in, e.g., both the horizontal and vertical directions, a frame memory 24 for storing output data from the A/D converter 20 or the compression circuit 22, a D/A converter 26 for converting image data read out from the frame memory 24 into an analog signal, an after treatment circuit 28 for executing after treatments (e.g., high-frequency removal, amplification, buffering, superimposing of an image such as a cursor, a track number, or the like (to be described later), and the like) of the output from the D/A converter 26, and a monitor device 30 for visually displaying the output from the after treatment circuit 28.

The apparatus further includes a system control circuit 32 having an internal submemory 34 for storing, e.g., reproduction track numbers (e.g., track numbers of tracks where images reproduced and displayed on small frames of the monitor device are respectively recorded), a wireless remote controller (to be simply referred to as a controller hereinafter) 36 for supplying instructions to the system control circuit 32, and a reception circuit 38 for receiving a radio signal from the controller 36, and transferring it to the system control circuit 32.

FIG. 2 shows the operation panel surface of the controller 36. The operation panel is provided with a power ON/OFF key 40, a four-picture display key 42, track feed keys 44 including four forward feed keys and four reverse feed keys corresponding to four small frames in a four-picture display mode, cursor moving keys 46 for moving a cursor on the monitor screen in the vertical and horizontal directions, a ten-key pad 48 including "0" to "9" keys, and an access key 50 for instructing reproduction of a track designated by one of the track feed keys 44, the cursor moving keys 46, or the ten-key pad 48. The detailed operations of the system control circuit 32 in response to the operations of these keys will be described later.

Figure 3B:
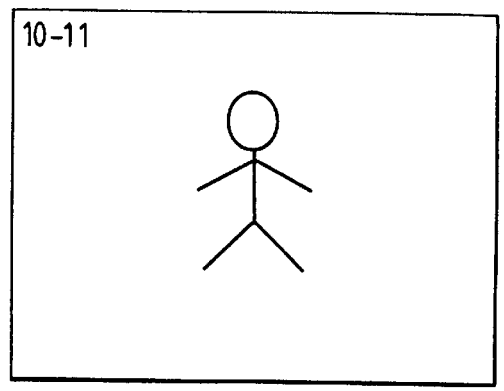
Figure 3C:
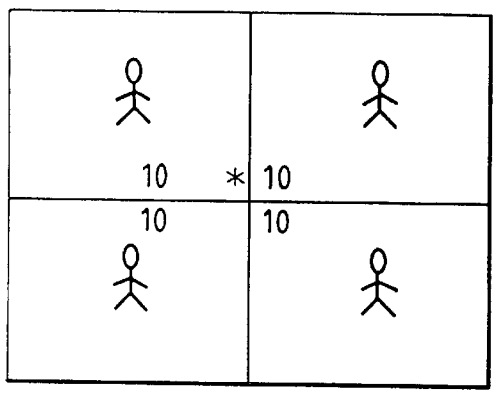
Figure 3D:
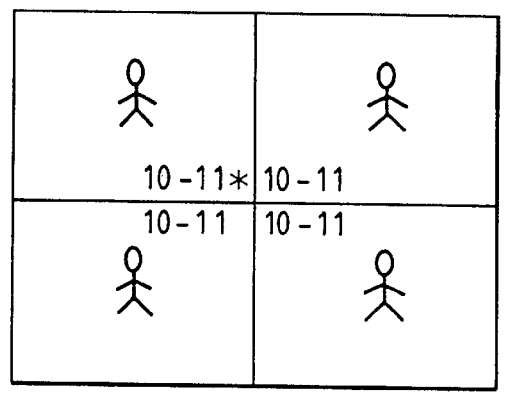

FIGS. 3A to 3D show display examples when a given video signal is frame-recorded on tracks #10 and #11 of the magnetic disc 10, and the reproduced video signal is displayed on the monitor device 30. FIG. 3A shows a case wherein the video signal is field-reproduced, and is displayed on the full screen (i.e., in the full-screen reproduction mode). FIG. 3B shows a case wherein the video signal is frame-reproduced, and is displayed on the full screen. FIG. 3C shows a case wherein the video signal is field-reproduced, and is displayed in the four-picture display mode. FIG. 3D shows a case wherein the video signal is frame-reproduced, and is displayed in the four-picture display mode. In the full-screen reproduction mode, "10" or "10–11" on the upper left corner indicates the number of the reproduced track. In the four-picture display mode, "10" or "10–11" near the center of the screen also indicates the number of the reproduced track. In the four-picture display mode, a mark "*" is a cursor for designating a small frame of interest.

Figure 4:
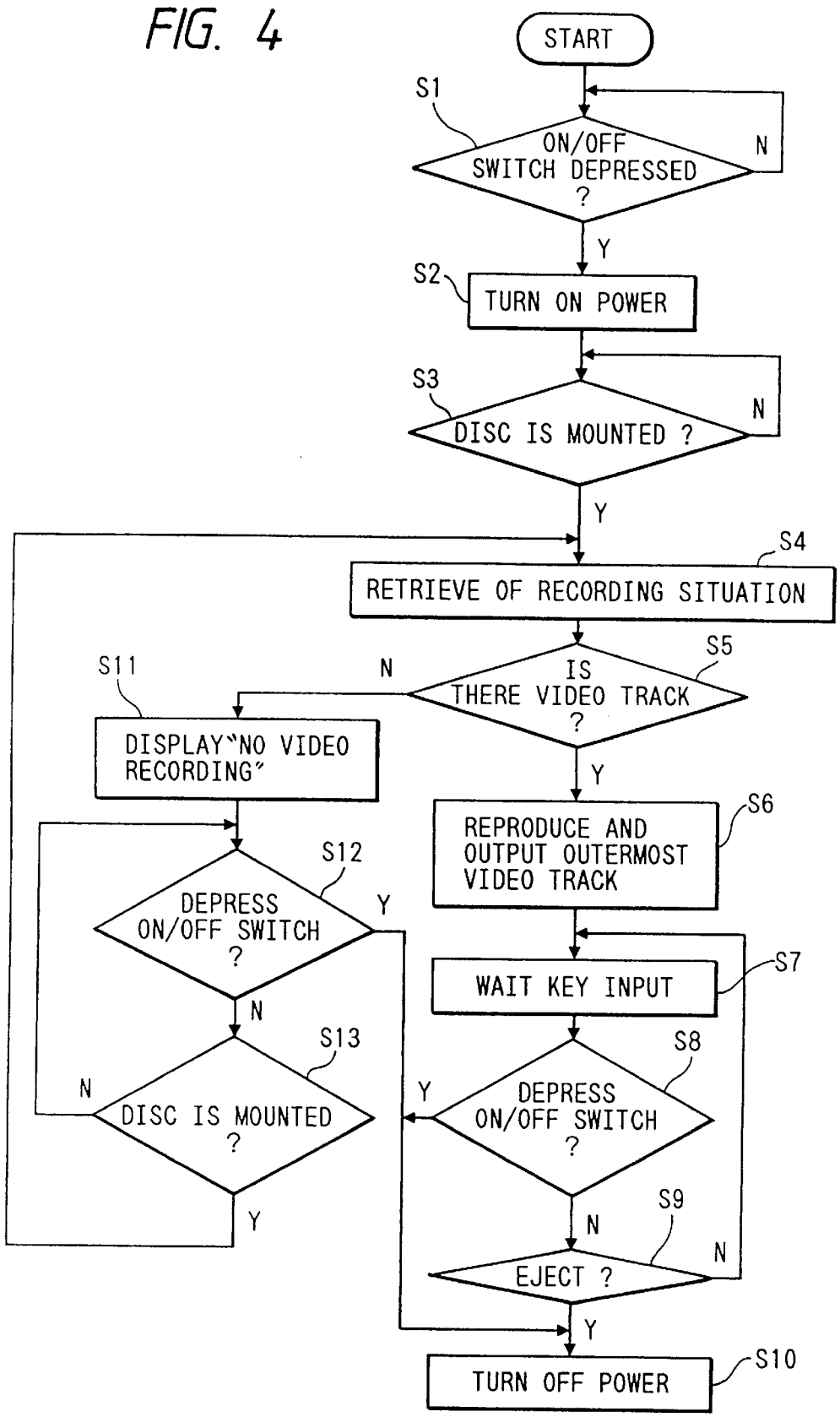
FIG. 4 is a flow chart showing an operation in response to an operation of a power ON/OFF key 40.

FIG. 4 is a flow chart showing the operation of the system control circuit 32 in response to the power ON/OFF key 40. Upon connection of a power supply line, the system control circuit 32 and the reception circuit 38 can operate with very low power consumption, and wait for an instruction from the controller 36. When the power ON/OFF key 40 is depressed (S1), the system control circuit 32 supplies power to the entire apparatus (S2), and waits for mounting of the magnetic disc 10 as a recording medium (S3).

When the magnetic disc 10 is mounted (S3), the recording situation (the presence/absence of recording, recording contents, field or frame recording in the case of a video signal, and the like) of the magnetic disc 10 is checked (S4). More specifically, the magnetic disc 10 is rotated by the motor 12, and the reproduction head is sequentially fed from the innermost track to the outermost track by the head travelling device 16, thereby checking the recording situations of the respective tracks.

When a track recorded with a video signal (to be referred to as a video track hereinafter) is detected (S5), the reproduction head 14 is moved to the outermost video track to reproduce a video signal therefrom. The output from the reproduction head 14 is subjected to the preliminary treatments by the preliminary treatment circuit 18, and is then converted into a digital signal by the A/D converter 20. The digital signal is frozen in the frame memory 24. Image data stored in the frame memory 24 is read out at a video rate, and the readout data is converted into an analog signal by the D/A converter 26. The analog signal is subjected to the after treatments of the after treatment circuit 28, and is then supplied to the monitor device 30.

While the video signal reproduced from the outermost video track is displayed on the monitor device 30, the control waits for a key input (S7). When the power ON/OFF key 40 is depressed (S8), or when the magnetic disc 10 is ejected (S9), the power supply is turned off (S10).

When no video track is detected (S5), a message "no video recording" is displayed (S11), and the power supply is turned off (S10) upon depression of the power ON/OFF key 40 (S12). When the magnetic disc 10 is inserted, i.e., replaced (S13), the flow returns to step S4 to check the recording situation.

Figure 5:
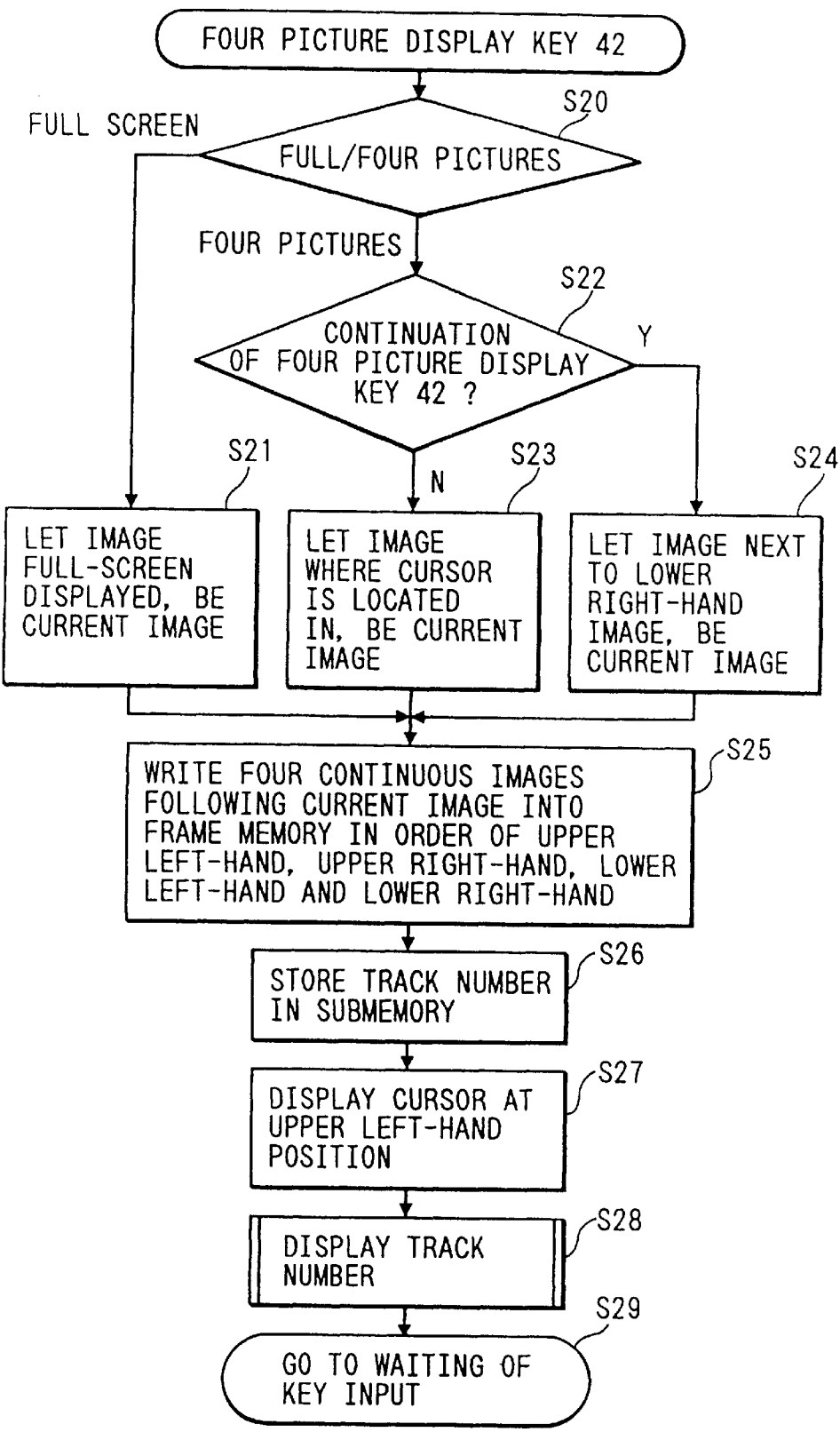
FIG. 5 is a flow chart showing an operation in response to an operation of a four-picture display key 42.

FIG. 5 is a flow chart showing an operation when the four-picture display key 42 is depressed during the key input waiting interval (S7). Upon depression of the four-picture display key 42, it is checked if the full-screen display mode or the four-picture display mode is selected (S20). If the full-screen display mode is selected (for example, when the four-screen display key 42 is depressed for the first time after the power supply is turned on), a track on which a full-screen displayed image is recorded is determined as a current track (S21). If the four-picture display operation has already been executed (S20), i.e., if the four-picture display key 42 is continuously operated (S22), a video track next to a track on which the lower right-hand image in the four-picture display mode is recorded is determined as a current track (S24); if the four-picture display key 42 is not continuously operated (S22), a track, on which an image where a cursor is located is recorded, is determined as a current track (S23).

Successive four video tracks including the current track are reproduced, and reproduced image data are written in the frame memory 24 in the order of the upper left-hand, upper right-hand, lower left-hand, and lower right-hand positions on the monitor screen (S25). The track numbers of the images stored in the frame memory 24 are stored in a predetermined area of the submemory 34 (S26).

The system control circuit 32 supplies an image signal of the cursor to the after treatment circuit 28 to display the cursor on a split image at the upper left-hand position on the monitor screen (S27). Similarly, as shown in FIGS. 3C and 3D, the track numbers of the displayed four images, and distinction between field recording (FI) and frame recording (FR) are displayed on the small frames (S28).

Thereafter, the flow returns to step S7 to wait for a key input (S29).

According to the flow chart shown in FIG. 5, upon the continuous operation of the four-picture display key 42, since the images are switched and displayed in units of four frames like a set of photographs, the contents of the magnetic disc 10 can be quickly and easily checked.

Figure 6:
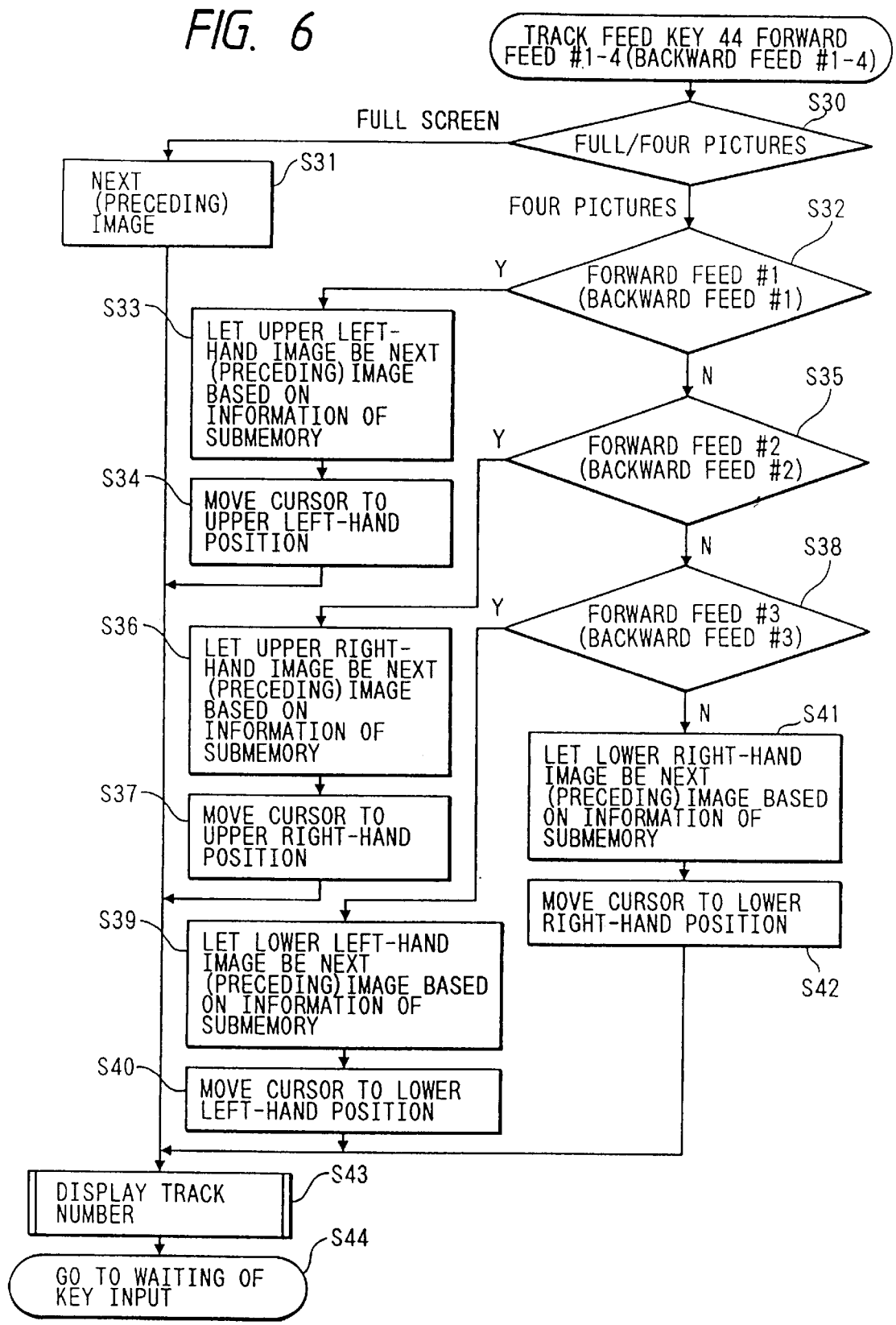
FIG. 6 is a flow chart showing an operation in response to an operation of track feed keys 44.

FIG. 6 is a flow chart showing an operation when the forward and backward track feed keys 44 are operated during the key input waiting interval (S7). When the full-screen display mode is selected (S30), an image recorded on a video track next to (in response to a forward feed key) or preceding (in response to a backward feed key) a track on which the currently displayed image is recorded is reproduced and displayed (S31).

When the four-picture display mode is selected (S30), in response to the operation of the forward (or backward) feed key #1 for the upper left-hand small frame (S32), an image on a video track next to (or preceding) a track of an image displayed on the upper left-hand small frame is reproduced on the basis of information in the submemory 34, and is displayed on the upper left-hand small frame (S33). More specifically, an image on the corresponding small frame is fed. Thereafter, the cursor is moved to the upper left-hand small frame (S34).

Similarly, in response to the operation of the forward (or backward) feed key #2 or #3 for the upper right-hand or lower left-hand small frame (S35 or S38), an image on the upper right-hand or lower left-hand small frame is fed (S36 or S39), and the cursor is moved to the upper right-hand or lower left-hand small frame (S37 or S40). When none of the forward (or backward) feed keys #1, #2, and #3 are operated (S38), since the forward (or backward) feed key #4 is operated, an image on the lower right-hand small frame is fed (S41), and the cursor is moved to the lower right-hand small frame (S42).

After step S31, 34, 37, 40, or 42, the displayed track number is updated (S43), and the flow returns to step S7 to wait for a key input (S44).

Figure 7:
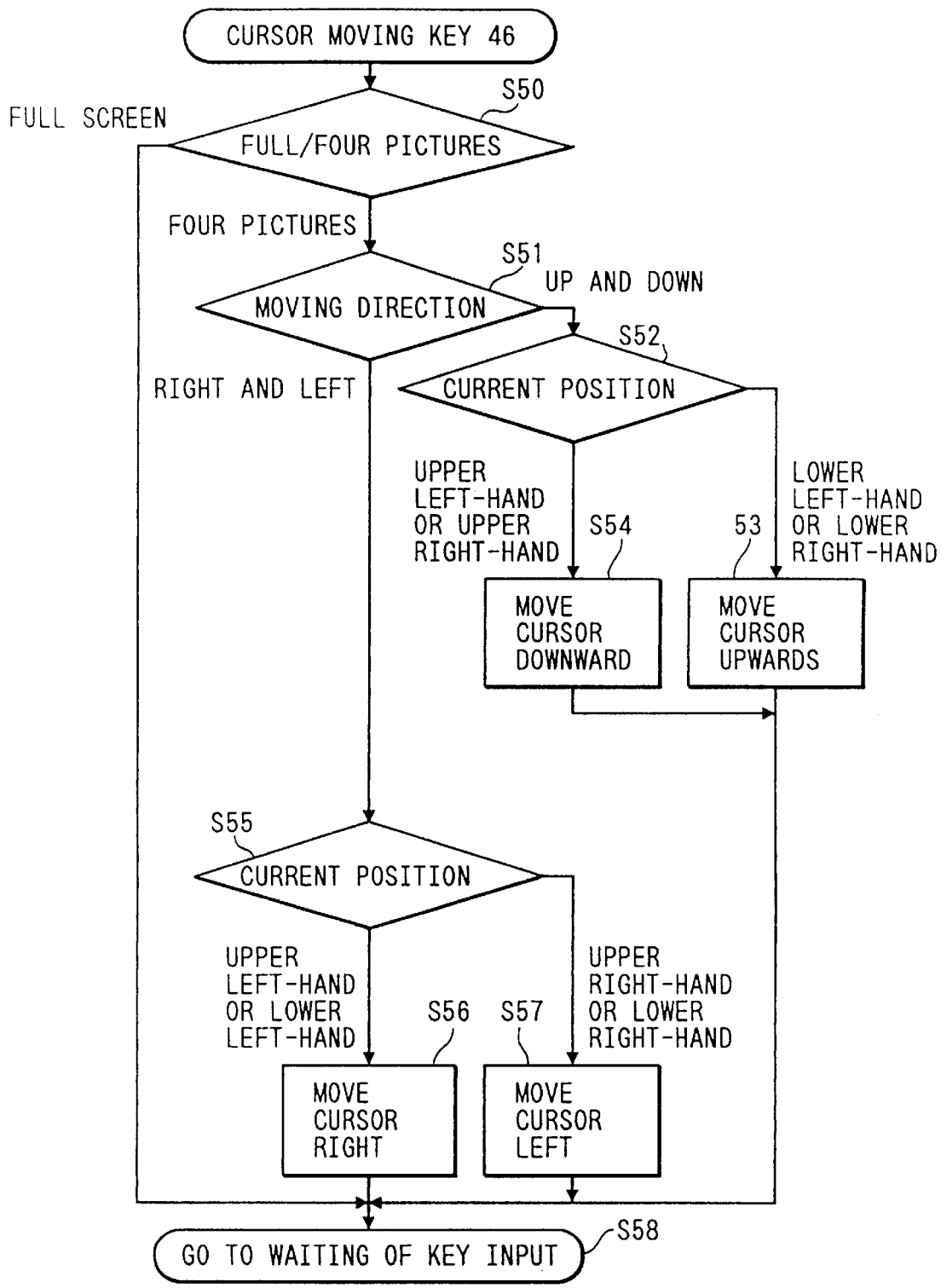
FIG. 7 is a flow chart showing an operation in response to an operation of cursor moving keys 46.

FIG. 7 is a flow chart showing an operation when the cursor moving keys 46 are operated. When the full-screen display mode is selected (S50), the key input is ignored, and the flow returns to step S7 to wait for a key input (S58). More specifically, the cursor moving keys 46 are effective only in the four-picture display mode. In the four-picture display mode (S50), the cursor is moved upward or downward or to the right or left (S53, S54, S56, or S57) according to the up, down, right or left cursor moving key and the current cursor position (S51, S52, or S55). Thereafter, the flow returns to step S7 to wait for a key input (S58).

When an image designated by the cursor in the four-picture display mode is to be displayed in the full-screen display mode, the access key 50 can be depressed. The operation at that time will be described later.

Figure 8:
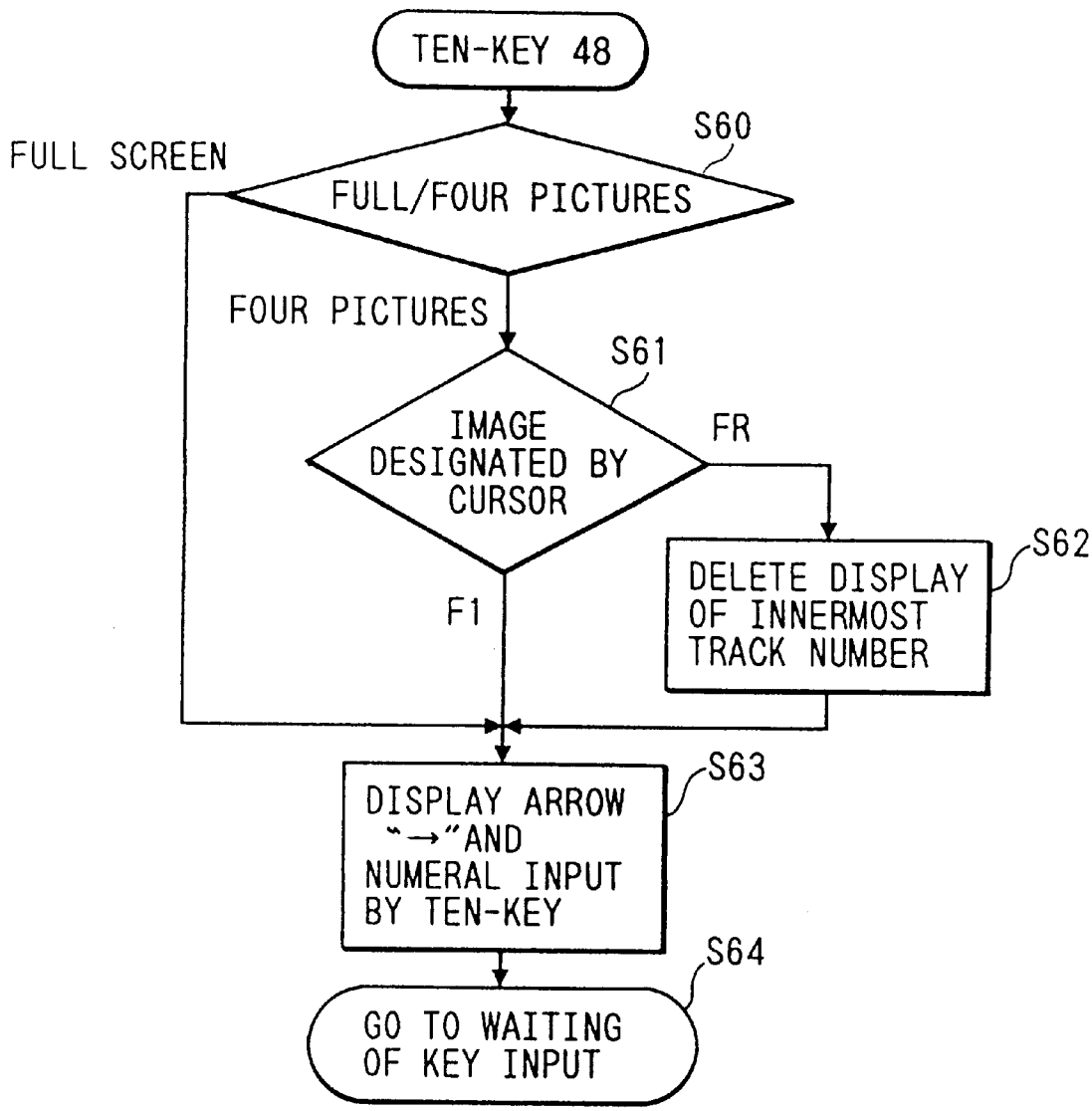
FIG. 8 is a flow chart showing an operation in response to an operation of a ten-key pad 48.
Figure 9:
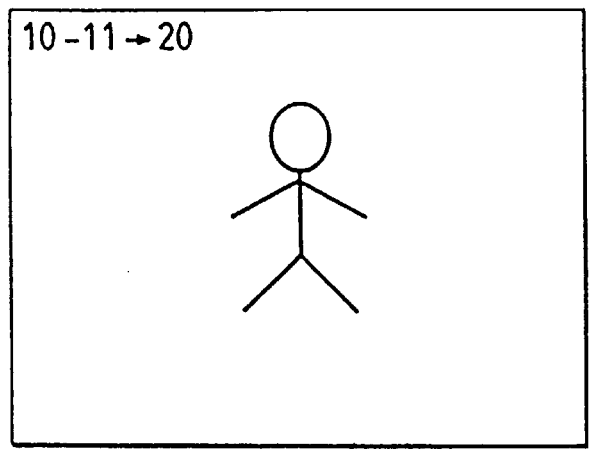
FIG. 9 shows a display example in response to the operation of the ten-key pad in a full-screen display mode.

FIG. 8 is a flow chart showing an operation when the ten-key pad 48 is operated. In the full-screen display mode (S60), as shown in FIG. 9, an arrow "→" and a numerical value input by the ten-key pad are displayed after the track number of the currently displayed image (S63), and the flow returns to step S7 to wait for a key input (S64). FIG. 9 shows the monitor screen when an image frame-recorded on the tracks #10 and #11 is frame-reproduced, and the track #20 is designated by the ten-key pad 48.

In the four-picture display mode (S60), it is checked if the displayed image designated by the cursor is frame (FR) reproduced or field (FI) reproduced (S61). If the image is FR-reproduced, the innermost track number is deleted (S62); if the image is FI-reproduced, the arrow "→" and a numerical value input by the ten-key pad are displayed after the currently displayed track number without deleting the innermost track number (S63). Thereafter, the flow returns to step S7 to wait for a key input (S64).

Figure 10A:
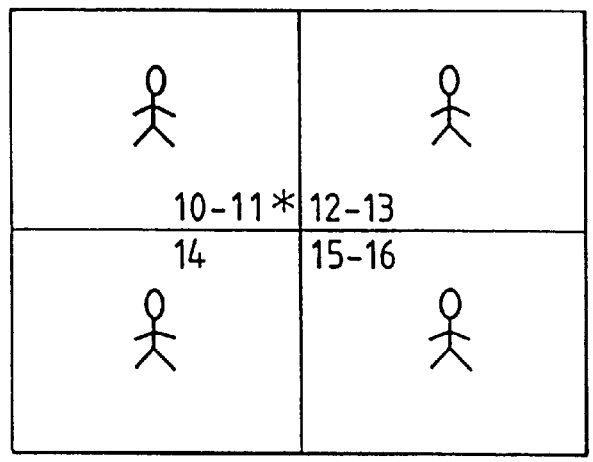
FIGS. 10A and 10B show display examples in response to the operation of the ten-key pad in a four-picture display mode.
Figure 10B:
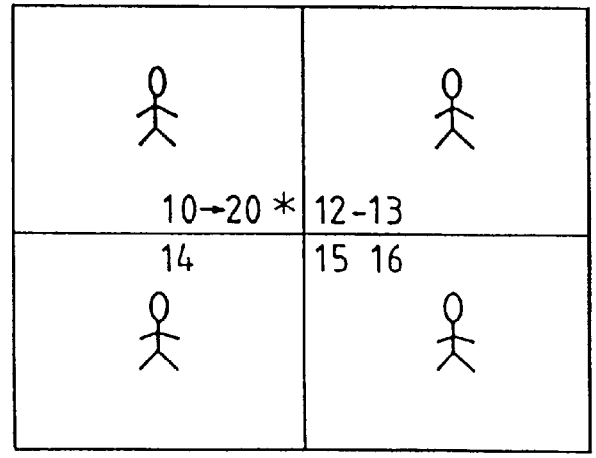

FIGS. 10A and 10B show display examples on the monitor device. FIG. 10A shows a display example before the ten-key pad 48 is operated, and FIG. 10B shows a display example after the ten-key pad 48 is operated. The cursor indicated by the mark "*" is located in the upper left-hand small frame, and an image frame-recorded on the tracks #10 and #11 is frame-reproduced on this frame. When "20" is input using the ten-key pad 48, the displayed track number is changed from "10–11" to "10→20", as shown in FIG. 10B.

In the key input waiting state after the ten-key pad 48 is operated, when the access key 50 is depressed, an image is reproduced from a track of the track number input using the ten-key pad, i.e., from the track #20, and is displayed on the small frame where the cursor is located (i.e., the upper left-hand small frame).

Figure 11:
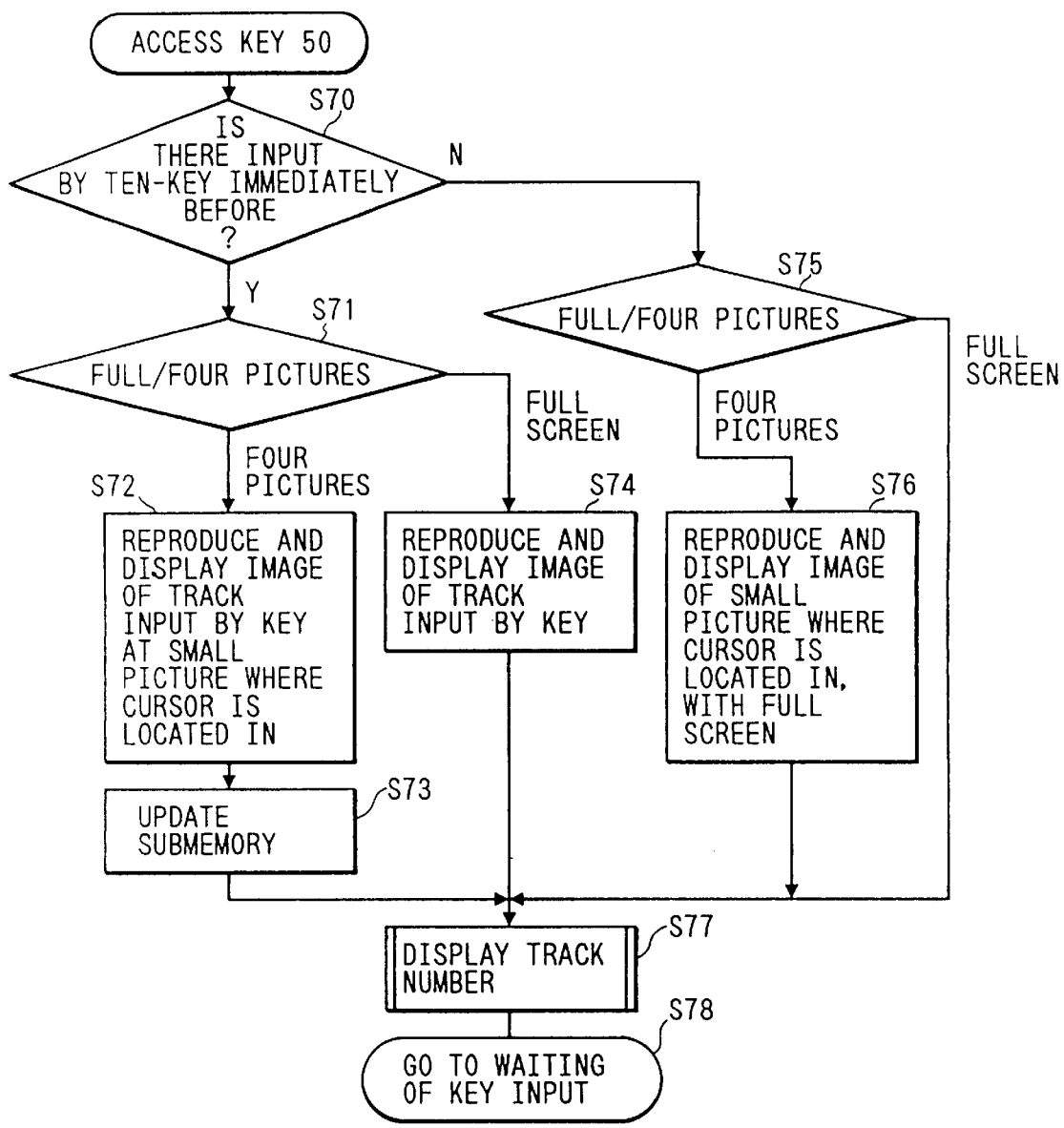
FIG. 11 is a flow chart showing an operation in response to an operation of an access key 50.

FIG. 11 is a flow chart showing an operation in response to the operation of the access key 50. It is checked if a ten-key input is made immediately before the operation of the access key 50 (S70). If a ten-key input is made (S70), it is checked if the full-screen or four-picture display mode is selected (S71). If the four-picture display mode is selected, an image recorded on the key-input track is reproduced and displayed on the small frame where the cursor is located, and the content of the submemory 34 is updated (S73). If the full-screen display mode is selected (S71), an image recorded on the key-input track is reproduced, and is displayed in the full-screen display mode (S74).

If no ten-key input is made immediately before the operation of the access key 50 (S70), it is checked if the full-screen or four-picture display mode is selected (S75). If the four-picture display mode is selected, an image displayed on the small frame where the cursor is located is displayed in the full-screen display mode. More specifically, the image displayed on the small frame where the cursor is located is reproduced from the magnetic disc 10 again, and the reproduced image data is stored in the frame memory 24 without going through the compression circuit 22. In the full-screen display mode, no operation is performed in response to the operation of the access key 50.

Thereafter, the displayed track number is updated (S77), and the flow returns to step S7 to wait for a key input (S78).

Figure 12:
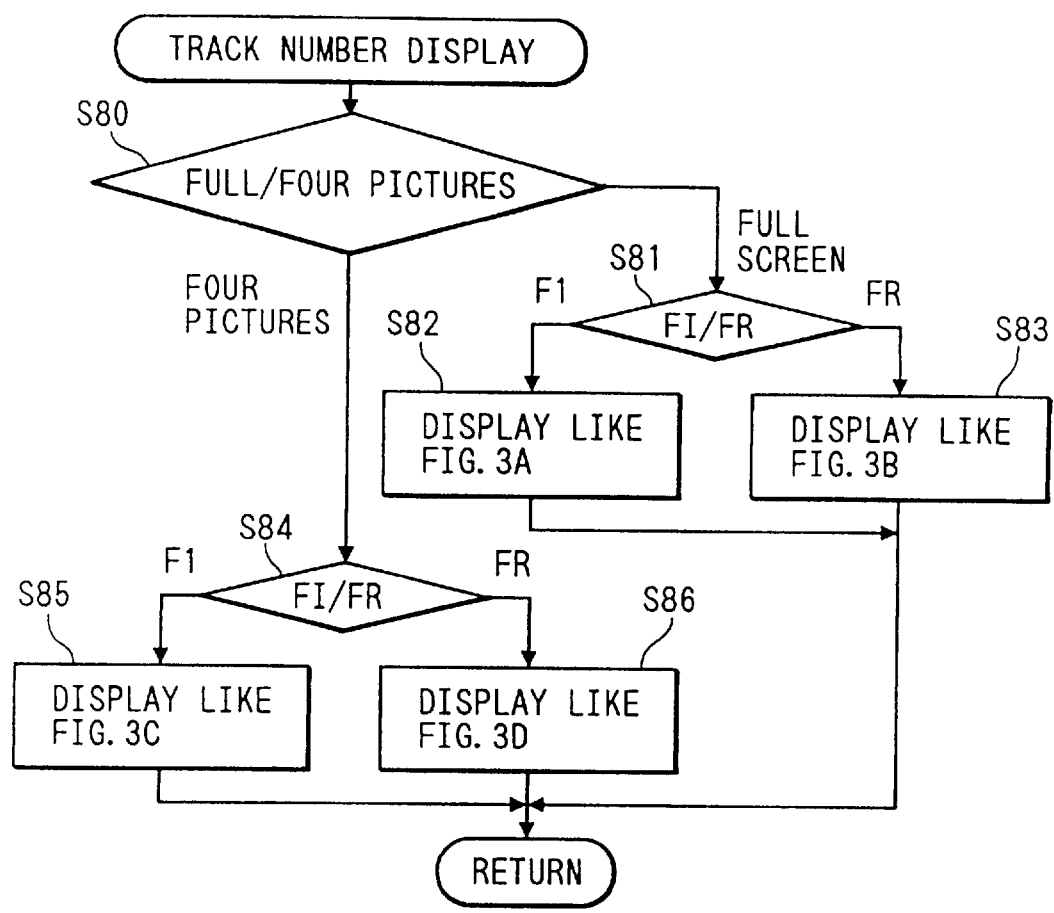
FIG. 12 is a flow chart showing a track number display operation.

FIG. 12 is a flow chart showing a track number display operation. The track number is displayed, as shown in FIGS. 3A to 3D, according to the full-screen or four-picture display mode (S80) and the FR- or FI-reproduction mode. More specifically, when the full-screen display mode is selected, and an image is field-recorded (S80, S81), the track number is displayed, as shown in FIG. 3A (S82); when the full-screen display mode is selected, and an image is frame-recorded (S80, S81), the track number is displayed, as shown in FIG. 3B (S83); when the four-picture display mode is selected, and an image is field-recorded (S80, S84), the track number is displayed, as shown in FIG. 3C (S85); and when the four-picture display mode is selected, and an image is frame-recorded (S80, S84), the track number is displayed, as shown in FIG. 3D (S86).

In the above embodiment, the still video floppy has been exemplified. However, the present invention can be applied to any other recording media, including a solid-state memory such as a memory card, an optical disk, a magneto-optical disk, and the like. The shape of the cursor is not limited to a specific shape, but may have a cross shape, an arrow-like shape, a rectangular shape, and the like. Alternatively, the cursor may have a frame-like shape for surrounding one of the four small frames in the four-picture display mode, or may be expressed in a specific color or pattern. The number of images to be simultaneously displayed is not limited to four.

As can be easily understood from the above description, according to this embodiment, the recording position on a recording medium can be directly designated for each image displayed in the multi-picture display mode. More specifically, an operation for simultaneously displaying images requested by a user in a multi-picture reproduction mode can be simplified.

Furthermore, according to the above embodiment, images displayed in the multi-picture reproduction mode can be simultaneously switched, and the contents of the recording medium can be easily checked.

The second embodiment of the present invention will be described below with reference to FIGS. 13 to 16C.

According to this embodiment, there is disclosed an apparatus comprising image reproduction means for outputting an image signal representing a multi-frame image consisting of a plurality of reproduced images, and selectively superimposing means for selectively superimposing predetermined display data on each of the plurality of reproduced images constituting the multi-frame image represented by the image signal output from the image reproduction means.

In this apparatus, the selective superimposing means can select whether or not the predetermined display data such as a cursor or a track number is superimposed on the image signal. When the image signal is printed or recorded on another recording medium, an image without the cursor, or the like can be printed or recorded.

Figure 13:
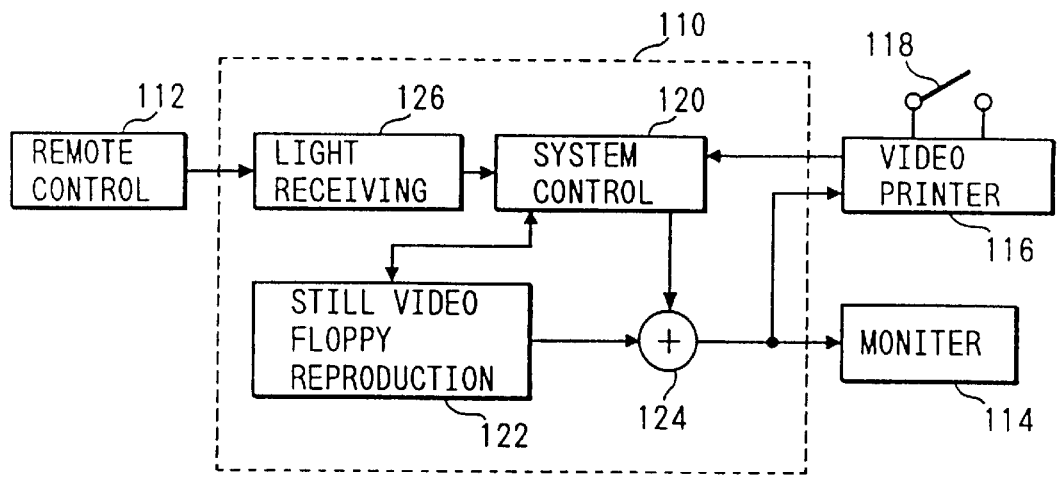
FIG. 13 is a block diagram showing an arrangement according to the second embodiment of the present invention.

FIG. 13 is a block diagram showing a system according to the second embodiment of the present invention. The system of this embodiment includes a still video floppy reproduction apparatus 110, a wireless remote controller (to be simply referred to as a controller hereinafter) 112 for remote-controlling the reproduction apparatus 110, a monitor device 114 for displaying an image reproduced by the reproduction apparatus 110, and a video printer 116. The video printer 116 has a print switch 118 for instructing a print operation. The video printer 116 freezes an input video signal in its internal memory in response to the ON operation of the print switch 118, color-separates the frozen video signal to cyan, magenta, yellow, and black signals, and prints these signals on a paper sheet.

The reproduction apparatus 110 includes a system control circuit 120 for controlling the entire system, and a still video floppy reproduction circuit 122 for reproducing data from a still video floppy, and outputting a full-screen or multi-picture display image signal under the control of the system control circuit 120. An adder 124 superimposes index information such as a track number and distinction between field reproduction and frame reproduction, and an image of a cursor from the system control circuit 120 on the output from the still video floppy reproduction circuit 122. A light receiving circuit 126 receives an infrared-ray control signal from the controller 112, and supplies the control signal to the system control circuit 120.

The still video floppy reproduction circuit 122 freezes a predetermined number of reproduced images from the still video floppy in its internal memory, and repetitively reads out the frozen image data from the internal memory, thereby outputting the full-screen or multi-picture display video signal.

Figure 14:
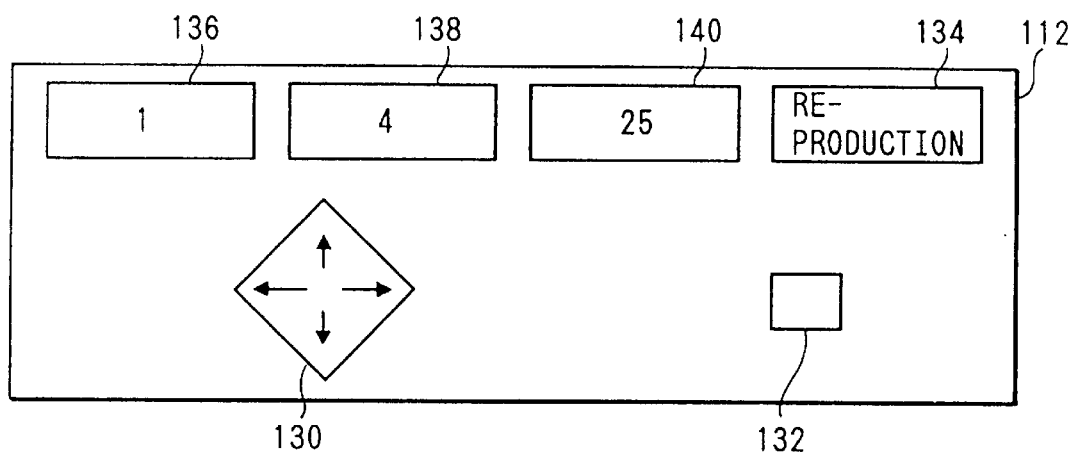
FIG. 14 is a front view of a wireless remote controller 112 shown in FIG. 13.

FIG. 14 shows some of the operation switches of the controller 112. The controller 112 is provided with a cursor key 130 for moving the cursor on the monitor screen in the vertical and horizontal directions, a display key 132 for turning on/off a display of the cursor and the track number, a reproduction key 134 for instructing execution of reproduction, a full display key 136 for displaying one reproduced image on the monitor device 114 in the full-screen display mode, a four-picture display key 138 for simultaneously displaying four frames, and a 25-picture display key 140 for simultaneously displaying 25 frames. In addition, the controller 112 has track moving keys (forward and backward feed keys) for moving a track from which data is to be reproduced, and the like.

Figure 15A:
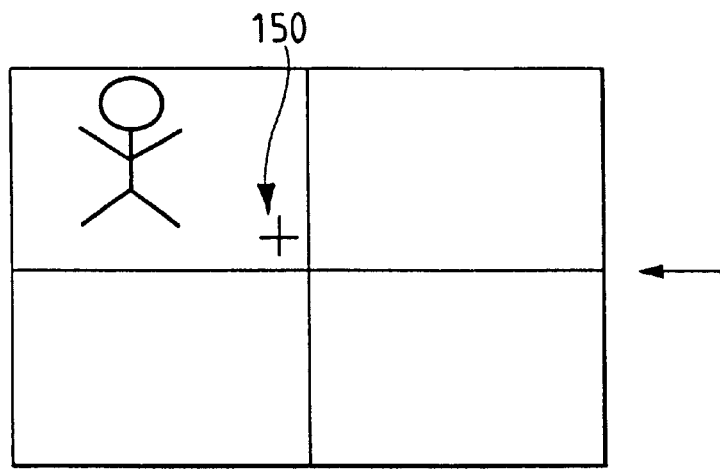
FIGS. 15A to 15C are explanatory views showing a transition state of display modes.
Figure 15B:
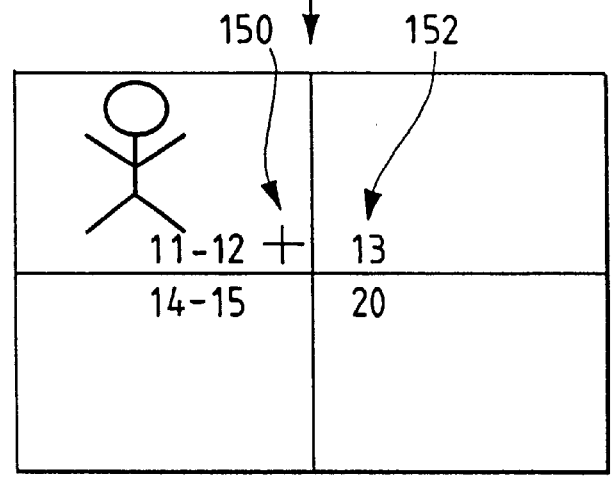
Figure 15C:
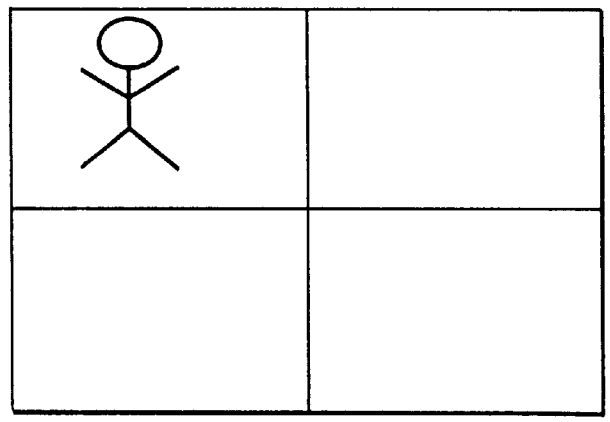

FIGS. 15A to 15C are explanatory views of the display key 132 in the case of the four-picture display mode. Upon operations of the display key 132, a display of a cursor 150 (FIG. 15A), a display of the cursor 150 and a track number 152 (FIG. 15B), and deletion of the cursor 150 and the track number 152 (FIG. 15C) are circulated. The cursor 150 normally blinks.

The system control circuit 120 supplies the image of the cursor 150 to the adder 124 at a timing corresponding to the position designated by the cursor key 130 in an initial state. The adder 124 superimposes the image of the cursor 150 on the output from the still video floppy reproduction circuit 122. On the monitor screen, as shown in FIG. 15A, the cursor 150 is superimposed on the reproduced image. In this state, once the display key 132 is operated, the system control circuit 120 supplies not only the image of the cursor 150 but also a character display image of a reproduced track number to the adder 124. On the monitor screen, as shown in FIG. 15B, the cursor 150 and the track number 152 are superimposed on the reproduced image. When the display key 132 is operated once more, the system control circuit 120 supplies neither the image of the cursor 150 nor the character display image of the reproduced track number to the adder 124. Thus, a display on the monitor screen is switched, as shown in FIG. 15C, so that the cursor 150 and the track number 152 are deleted, and only the reproduced image is displayed.

Figure 16A:
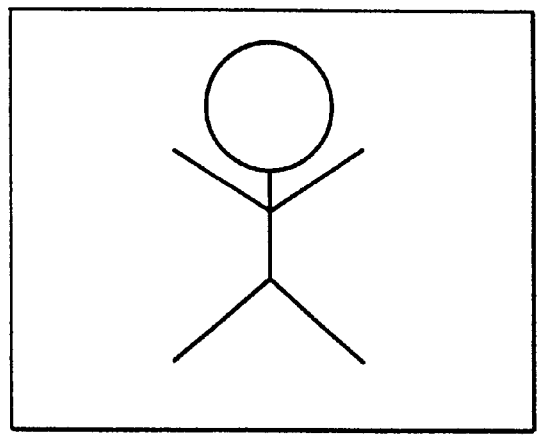
FIGS. 16A to 16C are explanatory views of a full display mode, a four-picture display mode, and a 25-picture display mode.
Figure 16B:
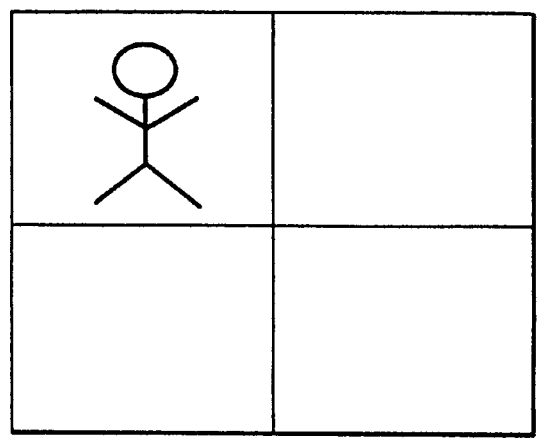
Figure 16C:
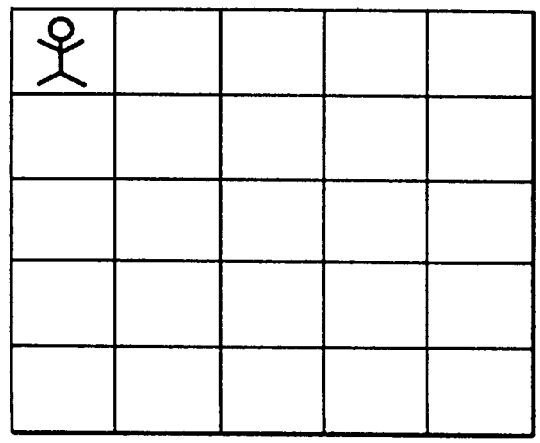

FIGS. 16A to 16C show display examples on the display screen of the monitor device 114. FIG. 16A shows a display example in the full-screen display mode, FIG. 16B shows a display example in the four-picture display mode, and FIG. 16C shows a display example in the 25-picture display mode.

When the full display key 136 on the controller 112 is turned on, the control signal is supplied to the system control circuit 120 through the receiving circuit 126, and the system control circuit 120 instructs the still video floppy reproduction circuit 122 to output a video signal for displaying one reproduced image (a reproduced image from one track in a field recording mode; a reproduced image from two tracks for recording first and second fields in a frame recording mode) in the full-screen display mode. The output video signal is supplied to the monitor device 114, and the reproduced image is displayed on the full screen.

The image displayed in the full-screen display mode at this time is an image located at the upper left-hand position in the multi-picture display mode before the full display key 136 is operated, an image designated by the cursor 150, or an image recorded on a track designated by the track moving switch (not shown).

When the four-picture display key 138 on the controller 112 is turned on, the control signal is supplied to the system control circuit 120 through the receiving circuit 126. The still video floppy reproduction circuit 122 reproduces four images including an image displayed in the immediately preceding full-screen display mode, an image at the upper left-hand position in the 25-picture display mode, or an image where the cursor 150 is located in the order of tracks according to the control signal from the system control circuit 120, and outputs a four-picture display video signal to the monitor device 114. The monitor device 114 simultaneously displays the four images, as shown in FIG. 16B.

Upon operation of the 25-picture display key 140, the monitor device 114 simultaneously displays 25 images, as shown in FIG. 16C. The still video floppy has 50 tracks, and can record a maximum of 50 images since it records a video signal for one field per track. Therefore, in the 25-picture display mode, half of the images recorded on one still video floppy can be simultaneously confirmed.

An operation for printing an image displayed on the monitor device 114 by the video printer 116 will be described below. When a user wants to see a hard copy of an image displayed on the monitor device 114, he or she turns on the print switch 118. The video printer 116 transmits a print request control signal to the system control circuit 120, and the system control circuit 120 stops supply of the images of the cursor 150 and the track number 152 irrespective of the display mode selected by the display key 132. As a result, the video signal output from the reproduction apparatus 110 is a full-screen or multi-picture display video signal consisting of only reproduced images.

The video printer 116 fetches the video signal output from the reproduction apparatus 110 after an elapse of a time required for changing the operation mode in the system control circuit 120 and the adder 124, color-separates the video signal to cyan, magenta, yellow, and black signals, and prints these signals in units of color components. For example, in the four-picture display mode, an image, which includes neither of the images of the cursor 150 nor the track number 152, and consists of only a reproduced image, as shown in FIG. 15C, can be printed.

Since the monitor device 114 receives the same video signal as that supplied to the video printer 116, the print content can be checked on the display screen of the monitor device 114.

In the above embodiment, the four-picture display mode has been exemplified. However, the present invention is not limited to this, but may be applied to a 16 (=4×4) frame display mode or a 25 (=5×5) frame display mode.

In the print operation, for example, when a print start switch of the printer 116 is turned on, or when the reproduction apparatus 110 is connected to the printer 116, the output from the reproduction circuit 122 may be directly supplied to the video printer 116 while bypassing the adder 124. Such a circuit including a selective bypass circuit and the adder 124 is also included in the selective superimposing means. With this arrangement, a reproduced image which includes neither of the images of the cursor 150 nor the track number 152, can be printed, and the quality of the printed image can be improved. On the other hand, in the monitor output operation, since the cursor and/or the track number are displayed, the above-mentioned full-screen display mode can be instructed while observing the monitor screen, resulting in convenience.

The still video floppy has been exemplified as an image recording medium. However, the present invention can be applied to various other recording media such as a solid-state memory, an optical disk, a magnetooptical disk, and the like. The shape of the cursor 150 is not limited to a specific shape, but may have a cross shape, an arrow-like shape, a rectangular shape, and the like. Alternatively, the cursor may have a frame-like shape for surrounding one of the four small frames in the multi-picture display mode, or may be expressed in a specific color or pattern.

As can be easily understood from the above description, according to this embodiment, a display of a cursor, a track number, and the like can be selectively turned on/off, and a print image without including images of these data can be easily obtained.

The third embodiment of the present invention will be described below with reference to the accompanying drawings.

Figure 17:
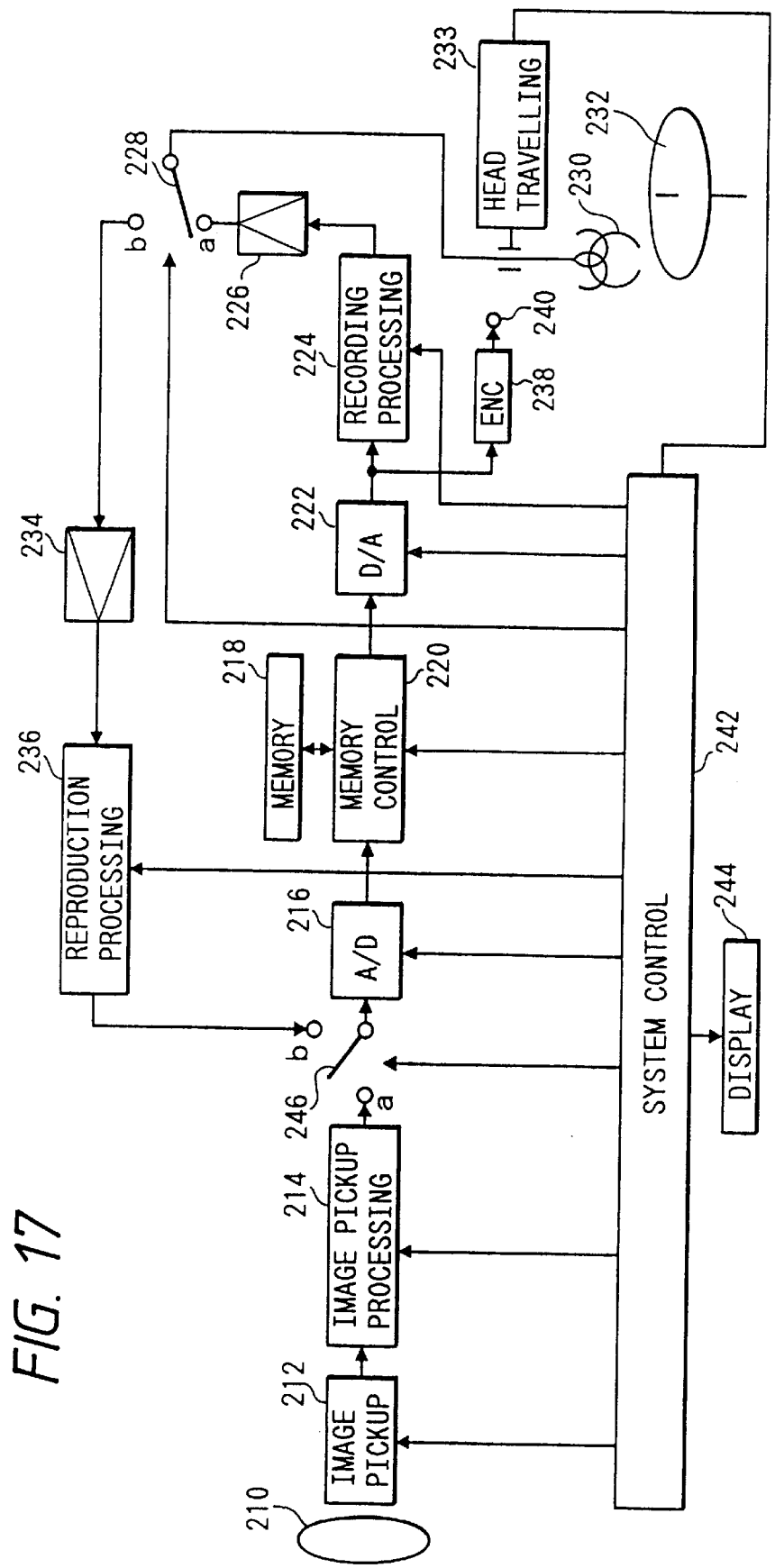
FIG. 17 is a block diagram showing an arrangement according to the third embodiment of the present invention.

FIG. 17 is a block diagram showing an arrangement of an apparatus according to the third embodiment of the present invention. The apparatus shown in FIG. 17 includes a photographing lens 210, an image pickup element 212, an image pickup processing circuit 214 for performing gamma correction of a signal output from the image pickup element 212, and outputting a video signal in a predetermined format, an A/D converter 216 for converting an analog signal into a digital signal, a memory 218 having a storage capacity for at least one frame, a memory control circuit 220 for controlling read/write access of the memory 218, a D/A converter 222 for converting a digital signal read out from the memory 218 into an analog signal, a recording processing circuit 224 for performing recording processing such as FM modulation of an output signal from the D/A converter 222, a recording amplifier 226 for amplifying an output from the recording processing circuit 224, a switch 228 connected to a contact a in a recording mode, and connected to a contact b in a reproduction mode, a recording/reproduction magnetic head 230, a magnetic disc 232 called a still video floppy, and a head travelling device 233 for feeding the magnetic head 230 in units of tracks in the radial direction of the magnetic disc 232.

The apparatus also includes a reproduction amplifier 234 for amplifying a reproduction output from the magnetic head 230, and a reproduction processing circuit 236 for performing reproduction processing such as FM demodulation of an output from the reproduction amplifier 234. The output from the reproduction processing circuit 236 is supplied to the A/D converter 216 and is converted into a digital signal, and the digital signal is stored in the memory 218. The apparatus also includes a video encoder 238 for converting an output from the D/A converter 222 into a standard television signal, e.g., an NTSC television signal, and an output terminal 240 for connecting the output from the video encoder 238 to, e.g., an external monitor device.

The apparatus further includes a system control circuit 242 for controlling the entire apparatus, a display device 244 for displaying, e.g., a track number, and a switch 246 for selectively supplying the output from the image pickup processing circuit 214 or the reproduction processing circuit 236 to the A/D converter 216. The switch 246 is connected to a contact a in the recording mode, and is connected to a contact b in the reproduction mode under the control of the system control circuit 242.

The operation of the overall apparatus shown in FIG. 17 will be described below. When the magnetic disc 230 is mounted, the system control circuit 242 checks the recording situations of all the tracks of the magnetic disc 230 to search non-recorded tracks. Since this operation is not related to the present invention, a detailed description thereof will be omitted. In the following description of the recording operation, for the sake of simplicity, data recording on a non-recorded magnetic disc 232 is assumed.

In the case of frame recording, the system control circuit 242 supplies a trigger signal to the image pickup element 212 in response to the operation of a release button (not shown). In response to this trigger signal, the image pickup element 212 converts an object image obtained by the photographing lens into an electrical signal for one frame (i.e., two fields). The generated electrical signal is read out from the image pickup element 212 in units of fields. The readout signal is gamma-corrected and converted into a video signal by the image pickup processing circuit 214. The output from the image pickup processing circuit 214 is supplied to the A/D converter 216 through the switch 246, and is converted into a digital signal. The memory control circuit 220 writes the output from the A/D converter 216 in the memory 218. In this manner, the memory 218 stores the digital image signals for the first and second fields.

The video signal for the first field stored in the memory 218 is read out first, and the readout signal is supplied to the D/A converter 222 through the memory control circuit 220. The D/A converter 222 converts the digital video signal into an analog video signal. The recording processing circuit 224 performs recording processing of the output from the D/A converter 222. The output from the recording processing circuit 224 is supplied to the magnetic head 230 through the switch 228, and is recorded on the magnetic disc 232.

After recording of the first field, the head travelling device 233 moves the magnetic head 230 by one track toward the innermost track side. After the track feeding operation, the video signal for the second field is read out from the memory 218. The readout signal is supplied to the magnetic head 230 through the memory control circuit 220, the D/A converter 222, the recording processing circuit 224, and the switch 228, and is recorded on the magnetic disc 232 like in the first field.

After recording of the second field, the system control circuit 242 causes the head travelling device 233 to move the magnetic head 230 to an inner non-recorded track for next recording.

A frame reproduction operation will be described below. The head travelling device 233 locates the magnetic head 230 on an outer one of two adjacent frame-recorded tracks, and a recording signal on the track is reproduced. The output from the magnetic head 230 is supplied to the reproduction amplifier 234 through the switch 228, and is amplified. The reproduction processing circuit 236 performs reproduction processing of the output from the reproduction amplifier 234. The reproduced video signal output from the reproduction processing circuit 236 is supplied to the A/D converter 216 through the switch 246. The A/D converter 216 converts the reproduced video signal into a digital signal, and its output is written in the memory 218 through the memory control circuit 220.

When the reproduced video signal for the first field is written in the memory 218, the system control circuit 242 causes the head travelling device 233 to move the magnetic head 230 by one track toward the innermost track side. The magnetic head 230 reads the recording signal for the second field recorded on the inner track, and its output is stored in the memory 218 in the same manner as in the first field. In this manner, the reproduced video signals for the first and second fields are stored in the memory 218.

The reproduced video signals for the first and second fields stored in the memory 218 are alternately and repetitively read out at the field period, and are supplied to the D/A converter 222 through the memory control circuit 220. The D/A converter 222 converts the digital signal into an analog signal. The video encoder 238 converts the output from the D/A converter 222 into a standard television format. The output from the video encoder 238 is supplied to, e.g., an external monitor connected to the output terminal 240. Thus, a reproduced image can be observed.

Figure 18:
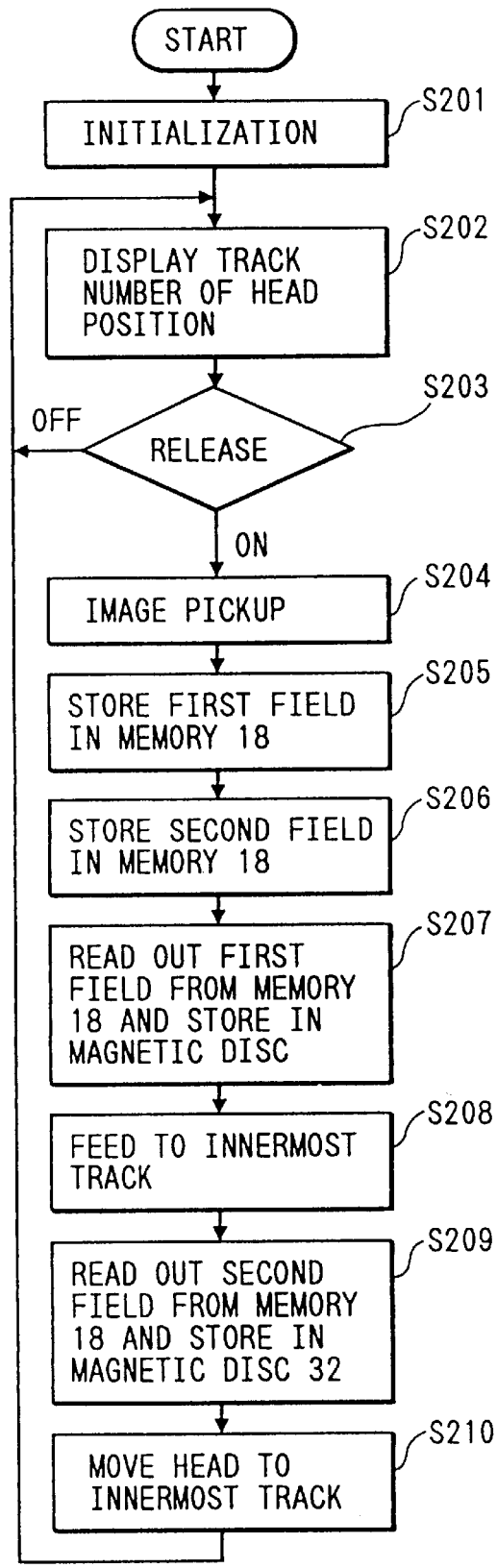
FIG. 18 is a flow chart showing a frame recording operation.
Figure 19:
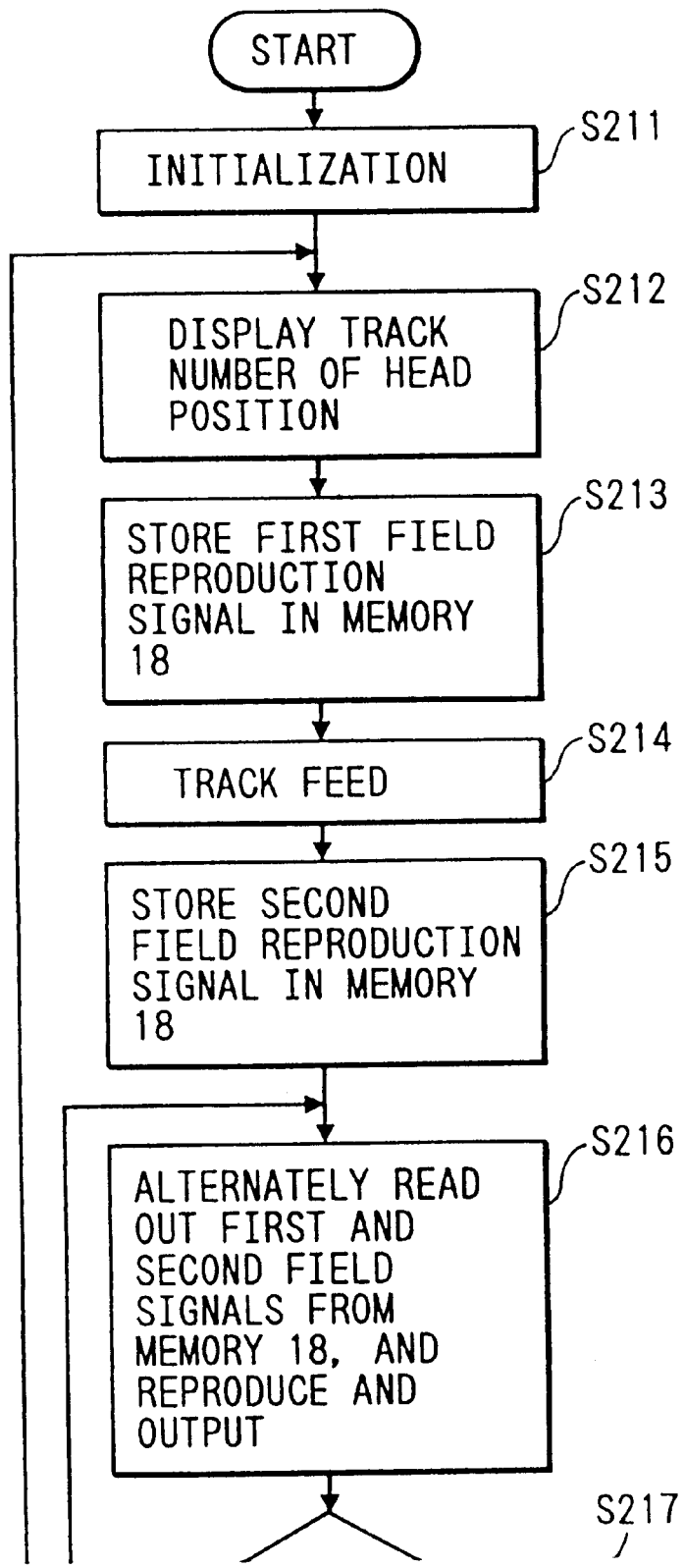
FIG. 19 is a flow chart showing a frame reproduction operation.

A track number display operation will be described in detail below with reference to the flow charts shown in FIGS. 18 and 19. FIG. 18 is a flow chart in the frame recording mode, and FIG. 19 is a flow chart in the frame reproduction mode.

The track number display operation in the frame recording mode will be described below with reference to FIG. 18. The entire apparatus is initialized (S1). The initialization includes checking of the recording situations of the mounted magnetic disc. Thereafter, the track number of a track opposing the magnetic head 230 is displayed on the display device 244 (S2), and the control waits until the release button (not shown) is turned on (S3). Although not shown, a track feed switch for changing the track position of the magnetic head 230 is arranged, and a user can move the magnetic head to an inner or outer arbitrary track position using the track feed switch.

When the release button is turned on (S3), exposure, i.e., photoelectric conversion of the image pickup element 212 is performed (S4), and signals for the first and second fields are stored in turn in the memory 218 (S5, S6). The signal for the first field is read out from the memory 218, and is recorded on the magnetic disc 232 (S7). The magnetic head 230 is moved by one track toward the innermost track side (S8). The signal for the second field is read out from the memory, and is recorded on the magnetic disc 232 (S9).

The magnetic head 230 is moved by one track toward the innermost track side (S10), and the track number displayed on the display device 244 is updated (S2). Thereafter, the control waits for the next operation of the release button (S3).

In this embodiment, in the frame recording mode, the track number of a track which records the second field is not displayed. This is the same display format as in a case wherein frame recording is performed using a recording apparatus adopting an in-line head, thus preventing a user from being unnecessarily confused.

The track number display operation in the frame reproduction mode will be described below with reference to FIG. 19. The entire apparatus is initialized (S11), and the track number of a track opposing the magnetic head 230 is displayed on the display device 244 (S12). The recording signal for the first field is reproduced, and the reproduced video signal is stored in the memory 218 (S13). The magnetic head 230 is moved by one track toward the innermost track side (S14). The recording signal for the second field is then reproduced, and the reproduced video signal is stored in the memory 218 (S15).

The reproduced video signals for the first and second fields are alternately and repetitively read out from the memory 218 at the field period, and the television signal of the reproduced image is output from the output terminal 240 (S16).

In response to a track feed instruction from the track feed switch (not shown) (S17), the head travelling device 233 moves the magnetic head 230 to another track position (S18), and the track number of the target track is displayed (S12).

In this embodiment, in the frame reproduction mode, the track number of a track which records the second field is not displayed. This is the same display format as in a case wherein frame reproduction is performed using a reproduction apparatus adopting an in-line head, thus preventing a user from being unnecessarily confused.

As can be easily understood from the above description, according to this embodiment, the track number can be displayed in the same format as in a recording/reproduction apparatus adopting an in-line head, and a user can be prevented from being unnecessarily confused.

Various changes and modifications of the above embodiments may be made within the scope of the appended claims.

What is claimed is:

1. A reproduction apparatus comprising:

reproduction means for performing on plural display areas multi-image reproduction of multiple images by simultaneously displaying a plurality of images reproduced from a medium; and a plurality of designating switches, each switch is arranged to a different image display area of the plural display areas for changing an image to be displayed in a corresponding display area.

2. An apparatus according to claim 1, wherein said medium comprises a disc-shaped medium.

3. An apparatus according to claim 1, further comprising means for supplying the plurality of images reproduced by said reproduction means to a monitor.

4. An apparatus according to claim 1, wherein each of said plurality of designating switches includes a forward key and a backward key.

* * * * *

UNITED STATES PATENT AND TRADEMARK OFFICE
CERTIFICATE OF CORRECTION

PATENT NO.    : 6,009,232
DATED         : December 28, 1999
INVENTOR(S)   : Yuji Sakaegi, et al.

It is certified that error appears in the above-identified patent and that said Letters Patent is hereby corrected as shown below:

[56] REFERENCES CITED:
U.S. PATENT DOCUMENTS, insert the following:

| | | | |
|---|---|---|---|
| -- 4,720,707 | 1/1998  | Konishi et al.   | 358/296 |
| 5,140,435    | 9/1992  | Suzuki et al.    | 360/72.1 |
| 4,907,095    | 3/1990  | Komura et al.    | 358/451 |
| 4,857,994    | 9/1989  | Belmares-Sarabia | 358/521 |
| 5,027,196    | 7/1989  | Ono              | 358/527 |
| 4,928,173    | 6/1989  | Yamamuro         | 348/107 |
| 4,958,220    | 12/1988 | Alessi           | 358/527 |
| 4,845,480    | 1/1988  | Satou            | 345/1 |
| 4,896,208    | 12/1987 | Moriya           | 358/452 --. |

SHEET 12:
FIG. 13, "MONITER" should read -- MONITOR --.

SHEET 17:
Please replace FIG. 19 with the following:

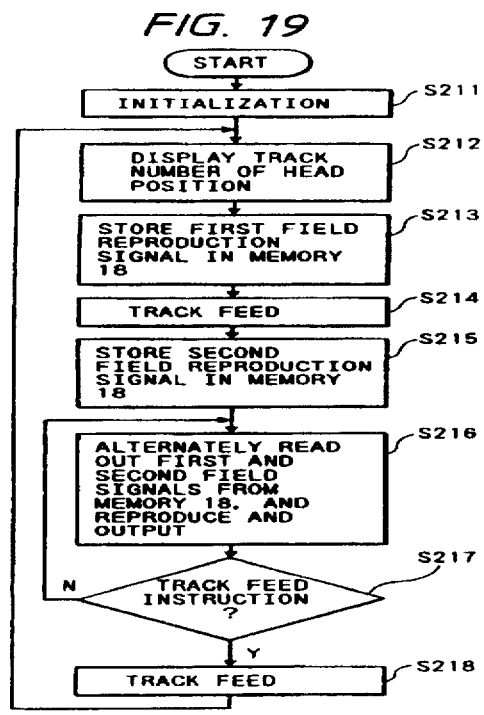

UNITED STATES PATENT AND TRADEMARK OFFICE
CERTIFICATE OF CORRECTION

PATENT NO.    : 6,009,232
DATED         : December 28, 1999
INVENTOR(S)   : Yuji Sakaegi, et al.

It is certified that error appears in the above-identified patent and that said Letters Patent is hereby corrected as shown below:

COLUMN 13:
Line 38, "(S1)." should read -- (S201). --.
Line 42, "(S2)." should read -- (S202). --.
Line 43, "(S3)." should read -- (S203). --.
Line 49, "(S3)," should read -- (S203), --.
Line 51, "(S4)," should read -- (S204), --.
Line 52, "(S5, S6)." should read -- (S205, S206). --.
Line 54, "(S7)." should read -- (S207). --.
Line 55, "(S8)." should read -- (S208). --.
Line 57, "(S9)." should read -- (S209). --.
Line 59, "(S10)," should read -- (S210), --.
Line 60, "(S2)." should read -- (S202). --.
Line 61, "(S3)." should read -- (S203). --.

COLUMN 14:
Line 9, "(S11)," should read -- (S211), --.
Line 11, "(S12)." should read -- (S212). --.
Line 13, "(S13)." should read -- (S213). --.
Line 15, "(S14)." should read -- (S214). --.
Line 17, "(S15)." should read -- (S215). --.
Line 22, "(S16)." should read -- (S216). --.
Line 24, "(S17)," should read -- (S217), --.
Line 26, "(S18)," should read -- (S218), --.
Line 27, "(S12)." should read -- (S212). --.

Signed and Sealed this

Twenty fifth Day of September, 2001

Attest:

NICHOLAS P. GODICI
Attesting Officer     Acting Director of the United States Patent and Trademark Office